United States Patent
Laps et al.

(10) Patent No.: US 12,249,463 B2
(45) Date of Patent: Mar. 11, 2025

(54) MULTI-TERMINAL MLCC FOR IMPROVED HEAT DISSIPATION

(71) Applicant: KEMET Electronics Corporation, Fort Lauderdale, FL (US)

(72) Inventors: Mark R. Laps, Simpsonville, SC (US); John Bultitude, Simpsonville, SC (US); Philip M. Lessner, Simpsonville, SC (US); Lonnie G. Jones, Simpsonville, SC (US); Allen Templeton, Simpsonville, SC (US); Nathan A. Reed, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

(21) Appl. No.: 17/233,796

(22) Filed: Apr. 19, 2021

(65) Prior Publication Data

US 2021/0327646 A1 Oct. 21, 2021

Related U.S. Application Data

(60) Provisional application No. 63/012,378, filed on Apr. 20, 2020.

(51) Int. Cl.
*H01G 4/258* (2006.01)
*H01G 4/012* (2006.01)
(Continued)

(52) U.S. Cl.
CPC .............. *H01G 4/258* (2013.01); *H01G 4/012* (2013.01); *H01G 4/232* (2013.01); *H01G 4/30* (2013.01);
(Continued)

(58) Field of Classification Search
CPC ............ H01G 4/012; H01G 4/38; H01G 4/30; H01G 4/258
See application file for complete search history.

(56) References Cited

U.S. PATENT DOCUMENTS 6,331,926 B1 12/2001 Anthony
6,690,567 B1 * 2/2004 Lawless ................. H01G 4/255
29/25.42
(Continued)

FOREIGN PATENT DOCUMENTS

JP 06151244 A * 5/1994 ............. H01G 4/012
JP 11288838 A * 10/1999
(Continued)

OTHER PUBLICATIONS

ISA/US; International Search Report prepared for PCT/US2021/027916; Date mailed: Jul. 20, 2021.
(Continued)

*Primary Examiner* — David M Sinclair
(74) *Attorney, Agent, or Firm* — Joseph T. Guy; Patent Filing Specialist Inc.

(57) ABSTRACT

Provided is a heat dissipating capacitor comprising internal electrodes of opposing polarity forming a capacitive couple between external terminations. A dielectric is between the internal electrodes. The heat dissipating capacitor comprises at least one thermal dissipation layer and at least one thermal conductive termination wherein the thermal dissipation layer is in thermally conductive contact with the thermal conductive termination.

39 Claims, 11 Drawing Sheets

(51) Int. Cl.
*H01G 4/12* (2006.01)
*H01G 4/232* (2006.01)
*H01G 4/30* (2006.01)
*H01G 4/38* (2006.01)

(52) U.S. Cl.
CPC ............. *H01G 4/38* (2013.01); *H01G 4/1227* (2013.01); *H01G 4/1236* (2013.01)

(56) References Cited

U.S. PATENT DOCUMENTS

| | | | |
|---|---|---|---|
| 7,907,386 B2 | 3/2011 | Aoki | |
| 8,885,319 B2 | 11/2014 | Bultitude et al. | |
| 9,318,263 B2* | 4/2016 | Seo | H01G 4/30 |
| 9,490,068 B2* | 11/2016 | Kim | H05K 1/181 |
| 10,283,267 B2* | 5/2019 | Lee | H01G 4/012 |
| 2005/0201040 A1* | 9/2005 | Ahiko | H01G 4/005 |
| | | | 361/321.2 |
| 2012/0275081 A1* | 11/2012 | Ahn | H01G 4/30 |
| | | | 29/25.42 |
| 2013/0208395 A1 | 8/2013 | Bultitude et al. | |
| 2014/0002952 A1 | 1/2014 | Bultitude et al. | |
| 2015/0131196 A1* | 5/2015 | Park | H01G 2/065 |
| | | | 361/275.3 |
| 2015/0170842 A1* | 6/2015 | An | H01G 4/012 |
| | | | 361/321.2 |
| 2015/0179339 A1* | 6/2015 | Seo | H01G 4/30 |
| | | | 361/301.4 |
| 2015/0325371 A1* | 11/2015 | Hattori | H01G 4/30 |
| | | | 361/301.4 |
| 2016/0035491 A1 | 2/2016 | Park et al. | |
| 2016/0211079 A1 | 7/2016 | Armstrong et al. | |
| 2017/0162335 A1* | 6/2017 | Ritter | H01G 7/06 |
| 2017/0169956 A1 | 6/2017 | Bultitude et al. | |
| 2017/0260046 A1* | 9/2017 | Hwang | C23C 16/45561 |
| 2019/0066927 A1 | 2/2019 | Bultitude et al. | |
| 2019/0341190 A1* | 11/2019 | Lee | H01G 4/008 |
| 2020/0243265 A1 | 7/2020 | Berolini et al. | |
| 2021/0027949 A1* | 1/2021 | Kobayashi | H01G 4/008 |

FOREIGN PATENT DOCUMENTS

| | | | | |
|---|---|---|---|---|
| JP | 2008311253 A | * | 12/2008 | |
| JP | 2013038332 A | * | 2/2013 | |
| JP | 2015041735 A | * | 3/2015 | ............ H01G 4/232 |
| JP | 2015162648 A | * | 9/2015 | |
| JP | 2017204547 A | * | 11/2017 | |
| JP | 6413259 B2 | * | 10/2018 | |
| JP | 2021034550 A | * | 3/2021 | |
| KR | 10-1701055 | | 1/2017 | |
| KR | 101701055 B1 | * | 1/2017 | |
| WO | WO-2005020256 A1 | * | 3/2005 | ............ H01G 4/232 |
| WO | WO 2019/173308 | | 9/2019 | |

OTHER PUBLICATIONS

ISA/US; International Preliminary Report on Patentability prepared for PCT/US2021/027916; Date mailed: May 10, 2022.

* cited by examiner

MULTI-TERMINAL MLCC FOR IMPROVED HEAT DISSIPATION

CROSS-REFERENCE TO RELATED APPLICATIONS

This application claims the priority of pending U.S. Provisional Patent Application No. 63/012,378 filed Apr. 20, 2020 which is incorporated herein by reference.

FIELD OF THE INVENTION

The present invention is related to an improved multi-layered ceramic capacitor (MLCC) and more particularly to an MLCC comprising at least one thermal dissipation layer and thermal conductive terminations wherein the thermal dissipation layers remove heat from the interior of the MLCC.

BACKGROUND

There is an ever-increasing desire for improved electronic devices, particularly, for use in the field of communications. The desire for connectivity has increased the demand for high powered electronic devices which has placed a particular burden on the electronic components forming the electronic devices. The instant invention is related to MLCC's, and improvements therein, as a component for electronic devices.

The use of MLCC's, in general, has proliferated throughout the electronics industry. The increasing power of electronic circuits increases the exposure of MLCC's to very high amounts of AC voltage. It is well known that the ripple current (I) produced in the capacitors results in an increase in heat. Power Dissipation (P) is defined by the equation:

$$P = I^2 R$$

where R is the equivalent series resistance (ESR). This power dissipation is frequency dependent and since ESR declines with increasing frequency so does this self-heating.

Heat is dissipated primarily at the surface of the capacitor typically at the ceramic and metal terminations. Since typical ceramics used as dielectrics have comparatively low thermal conduction, compared to metals commonly used in the internal electrodes, the heat is far more effectively dissipated through the electrodes connected to the terminations. To take advantage of this heat dissipation more electrodes per unit volume are desirable. Unfortunately, the number of electrodes per unit volume is limited by the need for separation to achieve reliable performance at higher voltages and the desire for miniaturization.

Capacitance, C, is defined by the equation:

$$C = \varepsilon_r \varepsilon_0 A n / t;$$

where $\varepsilon_r$ is the relative permittivity of the dielectric; $\varepsilon_0$ is a constant equal to the permittivity of free space; A is the overlap area for each internal conductive layer, also referred to as an active or internal electrode; n is the number of dielectric layers and t is the separation distance or dielectric thickness between the internal electrodes.

For any given dielectric this separation distance must be increased as the voltage rating of the capacitor increases. As the separation distance increases the number of internal electrodes per unit volume decreases as does the ability to conduct heat from the interior of the capacitor. The result is an ever-increasing problem with respect to thermal management, reliability and capacitor lifetime which is compromised at elevated temperatures.

The necessity to mitigate heat generation and propagation, and the conflicting desire for miniaturization, have confounded researchers. Provided herein is an improved MLCC wherein the thermal dissipation is significant with minimal increase in volume of the MLCC.

SUMMARY OF THE INVENTION

It is an object of the invention to provide an improved MLCC and particularly an MLCC with improved thermal dissipation.

A particular advantage of the instant invention is the ability to dissipate heat from the interior of the capacitor body with minimal detriment to volumetric efficiency.

Another particular feature of the present invention is the ability to form the improved MLCC using conventional manufacturing techniques and facilities.

These, and other advantages as will be realized, are provided in a heat dissipating capacitor comprising internal electrodes of opposing polarity forming a capacitive couple between external terminations. A dielectric is between the internal electrodes. The heat dissipating capacitor comprises at least one thermal dissipation layer and at least one thermal conductive termination wherein the thermal dissipation layer is in thermally conductive contact with the thermal conductive termination Yet another embodiment is provided in a heat dissipating capacitor comprising internal electrodes of opposing polarity forming a capacitive couple between the external terminations. A dielectric layer is between the internal electrodes. The heat dissipating capacitor further comprises at least one thermal dissipation layer wherein the thermal dissipation layer is not coplanar with an inner electrode of the inner electrodes. The thermal dissipation layer is in thermally conductive contact with a thermal conductive termination.

DESCRIPTION

The present invention provides an MLCC with improved thermal management capabilities. More specifically, the present invention provides an MLCC with at least one thermal dissipation layer wherein the thermal dissipation layer provides thermal conductivity but does not otherwise directly contribute to the electrical functionality of the MLCC. By decoupling the thermal dissipation properties and electrical functionality the thermal dissipation layers can be strategically located within the capacitor body for improved thermal dissipation.

The invention provides for improved thermal management within an MLCC body by augmenting the thermal dissipation provided by active internal electrodes by the incorporation of thermal dissipation layers. The thermal dissipation layers are connected to a thermal conduction terminal that functions as a heat sink and plays no active role in the electrical properties of the MLCC. It will also be realized from the teachings herein that multiple thermal dissipation terminals could be employed to further improve the heat dissipation. Multiple thermal dissipation terminals, thermally connected to the same or different thermal dissipation layers, can be particularly advantageous for larger MLCC's of for MLCC's likely to be subjected to very high AC voltage.

Power dissipation is frequency dependent. Electrothermal models show that power dissipation occurs in different areas of the capacitor dependent on the operational frequency. The result is asymmetric heating in a device which is referred to in the art as "hot spots" within the structure. In the case of lower frequencies, such as around 100 kHz, the heat generation is primarily in the ceramic dielectric and it is therefore desirable to remove heat from the center of the MLCC. In the case of higher frequencies, such as around 100 MHz, most power is dissipated in the outer electrodes. Dependent on the application frequency, thermal dissipation layers may be more preferably disposed in the center of the MLCC, to protect against heat generation of the dielectric, or towards the outside, to protect against heating of the outer electrodes. For general applications the distribution of thermal dissipation layers may be disposed symmetrically through the structure.

The invention will be described with reference to the figures which are an integral, but non-limiting, part of the specification provided for clarity of the invention. Throughout the various figures similar elements will be numbered according.

Figure 1:
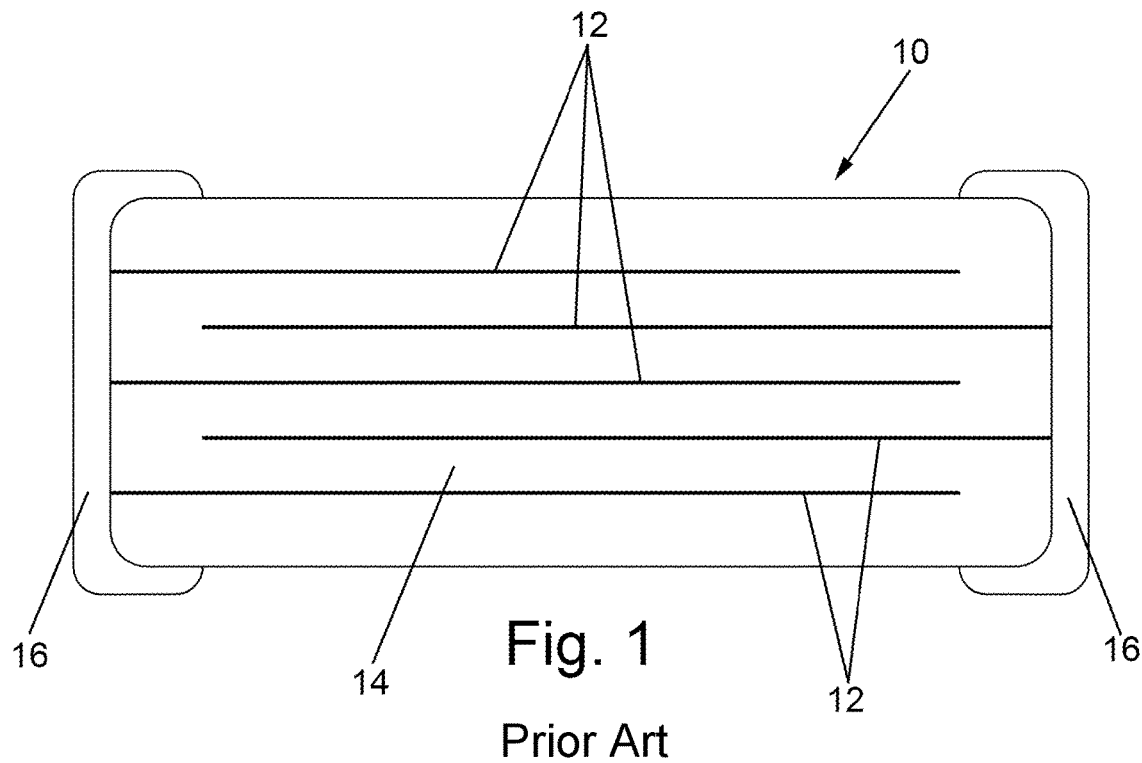
FIG. 1 is a schematic cross-sectional view of a prior art device.

A prior art MLCC is illustrated in schematic cross-section in FIG. 1. In FIG. 1, the MLCC, 10, comprises internal electrodes, 12, separated by a dielectric, 14, wherein adjacent internal electrodes terminate at opposite external terminations, 16. The internal electrodes of opposite polarity, separated by a dielectric, form the capacitive couple as well known to those of skill in the art. Throughout the specification a limited number of internal electrodes will be illustrated with the understanding that in practice the number of internal electrodes is not particularly limited with many hundreds of internal electrodes being common in the art depending on the application.

The method of forming an MLCC is well known in the art and not further described herein. The internal electrodes, external terminations and dielectric are suitable for demonstration of the invention are not altered by the incorporation of the invention and virtually any capacitive couple and external termination commonly employed and known in the art can be used with the heat dissipation functionality described herein incorporated within the structure of the MLCC.

Figure 2:
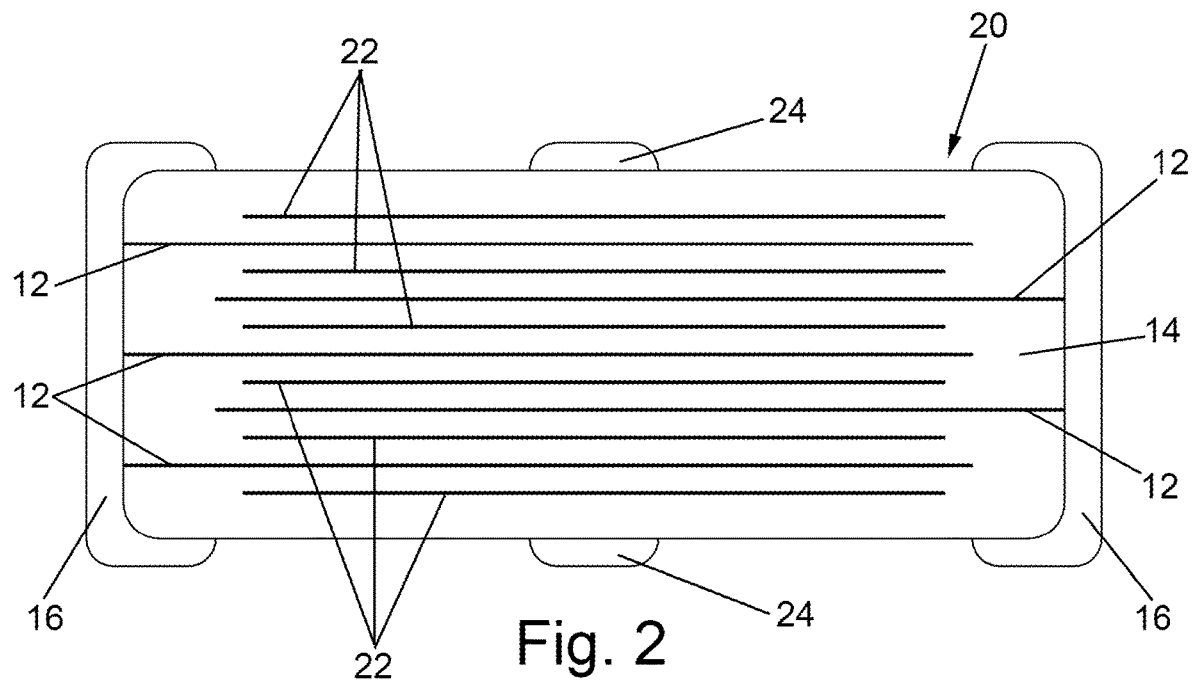
FIG. 2 is a schematic cross-sectional view of an embodiment of the invention.

A heat dissipating capacitor is illustrated in schematic cross-sectional view in FIG. 2. The heat dissipating capacitor, 20, comprises internal electrodes, 12, dielectric, 14, and external terminations, 16, which are taken together to form a capacitor. Thermal dissipating layers, 22, dispersed throughout the heat dissipating capacitor, terminate at a thermal conductive terminal, 24. As would be realized, the thermal dissipating layers and thermal conductive terminal do not actively contribute to the electrical functionality of the capacitive couple or the capacitor.

Figure 3:
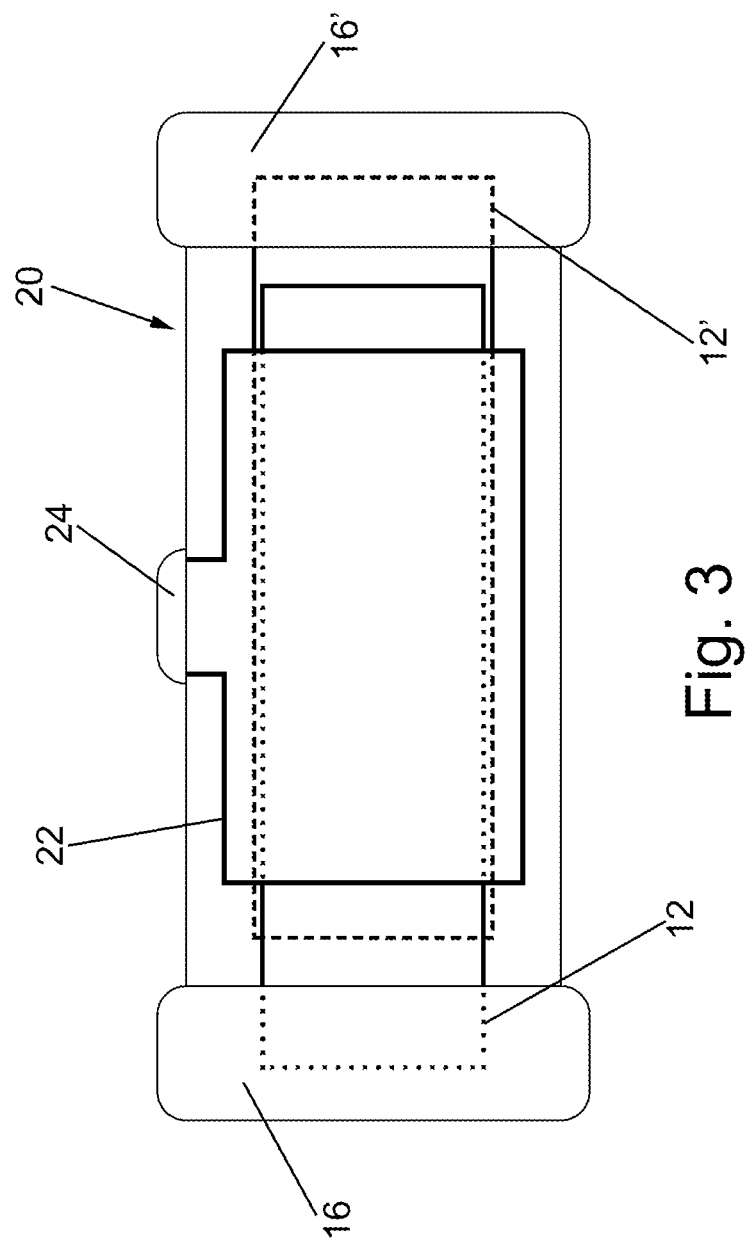
FIG. 3 is a schematic cross-sectional top view of an embodiment of the invention.

A heat dissipating capacitor is in schematic top view in FIG. 3 wherein the overlayed layers are illustrated. In FIG. 3, the heat dissipating capacitor, 20, comprises alternating internal electrodes, 12 and 12', of opposite polarity separated by dielectric, 14. Adjacent internal electrodes are in direct electrical contact with opposite external terminations, 16 and 16'. At least one thermal dissipating layer, 22, is in thermally conducting contact with a thermal conductive terminal, 24.

Figure 4:
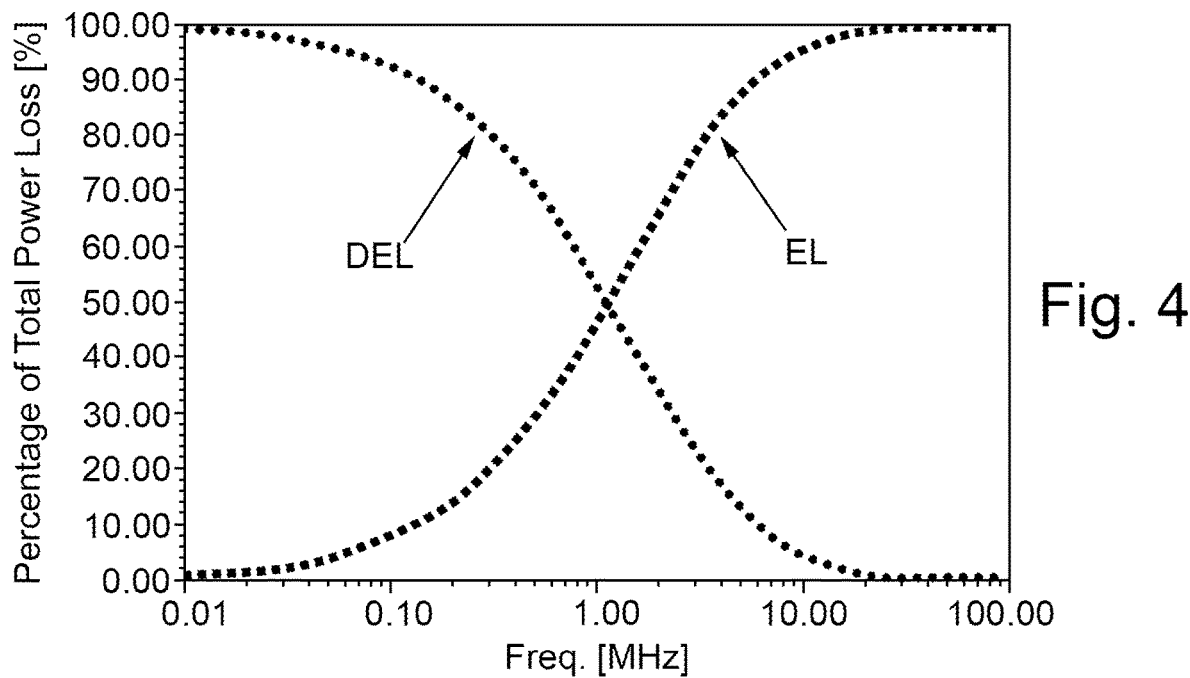
FIG. 4 is a graphical representation of power loss contributions.

A particular advantage of the instant invention is the ability to distribute thermal dissipation layers in various portions of the structure depending on the intended application. Power loss contributions as a function of frequency are illustrated graphically in FIG. 4. In FIG. 4, dielectric loss (DEL) represents the major contributor to power loss at low frequency and electrode loss (EL) represents the major contributor to power loss at high frequency. DEL loss occurs throughout the dielectric, and therefore throughout the body of the capacitor, regardless of the orientation of the internal electrodes relative to the substrate. With internal electrodes parallel to the substrate, EL loss occurs primarily over the entirety of those internal electrodes closest to the substrate. With internal electrodes perpendicular to the substrate, EL occurs from all electrodes however, the primary loss occurs predominantly from that portion of the electrodes closest to the substrate as opposed to the entire internal electrode.

Figure 5:
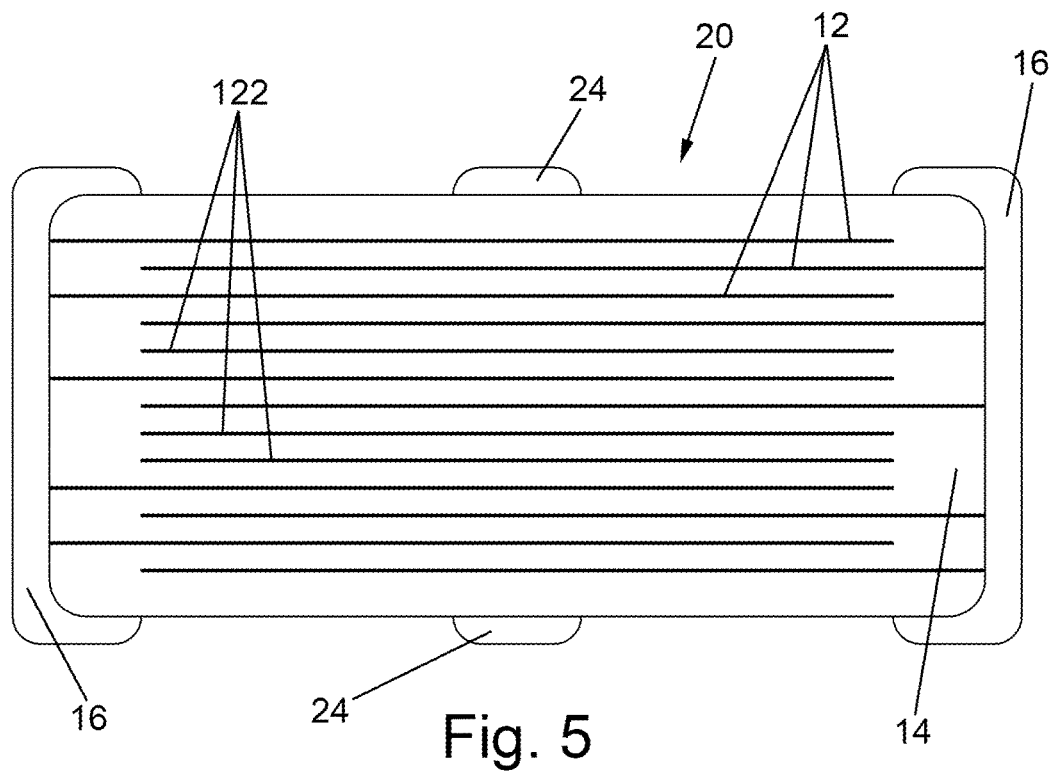
FIG. 5 is a schematic cross-sectional view of an embodiment of the invention.

An embodiment of the invention will be described with reference to FIG. 5. In FIG. 5 a heat dissipating capacitor, 20, is illustrated in cross-sectional schematic view. The heat dissipating capacitor comprises alternating internal electrodes, 12, of opposite polarity separated by dielectric, 14, wherein adjacent internal electrodes are in direct electrical contact with opposite external terminations, 16. At least one internal thermal dissipating layer, 122, is in thermally conductive contact with a thermal conductive terminal, 24. Internal thermal dissipating layers, 122, are centrally located with at least one internal electrode exterior to the internal thermal dissipating layer. Internal thermal dissipating layers dissipate heat through at least one thermal conductive termination, 24. Internal thermal dissipating layers are preferable for low frequency applications since they are more capable of dissipating heat from the interior of the capacitor such as that arising from DEL.

Figure 6:
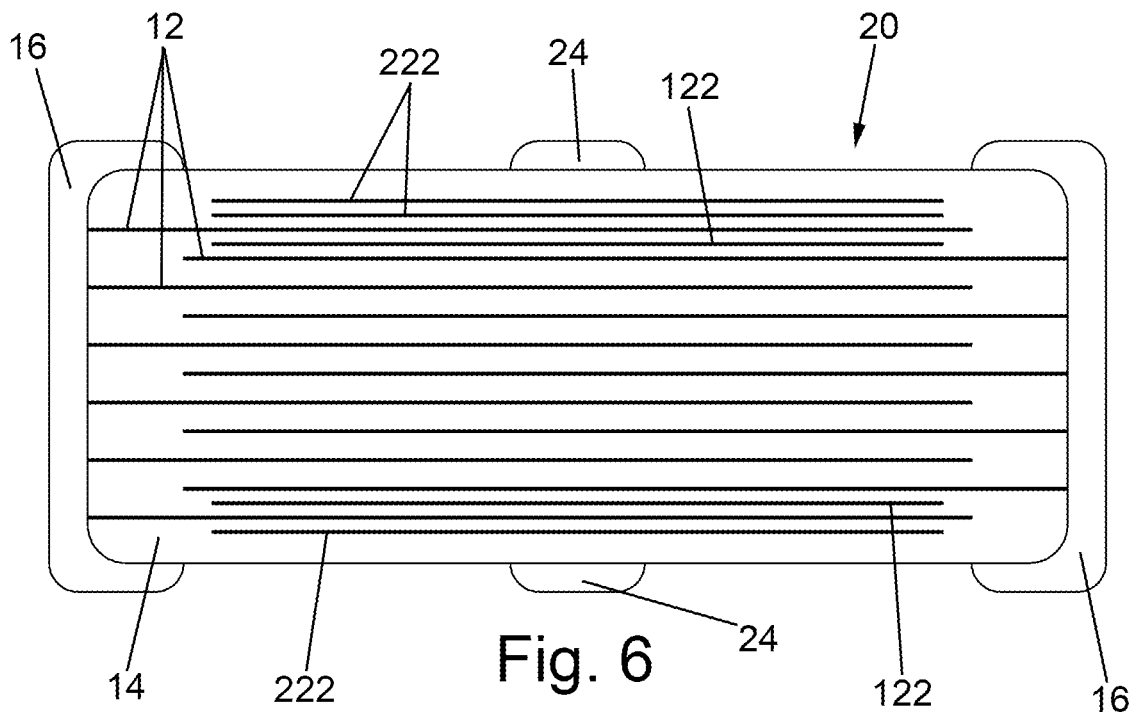
FIG. 6 is a schematic cross-sectional view of an embodiment of the invention.

An embodiment of the invention will be described with reference to FIG. 6. In FIG. 6 a heat dissipating capacitor, 20, is illustrated in cross-sectional schematic view. The heat dissipating capacitor comprises alternating internal electrodes, 12, of opposite polarity separated by dielectric, 14, wherein adjacent internal electrodes are in electrical contact with opposite external terminations, 16. At least one external thermal dissipating layer, 222, is in thermally conductive contact with a thermal conductive terminal, 24. External thermal dissipating layers, 222, are externally located with the internal electrodes interior to the thermal dissipating layers. The thermal dissipating layers dissipate heat through at least one thermal conductive termination, 24. External thermal dissipating layers are preferable for high frequency applications since they are more capable of dissipating heat from the internal electrodes of the capacitor such as that arising from the EL. As would be realized from further discussion herein internal thermal dissipating layers and external thermal dissipating layers can be used independently or in concert.

Figure 7:
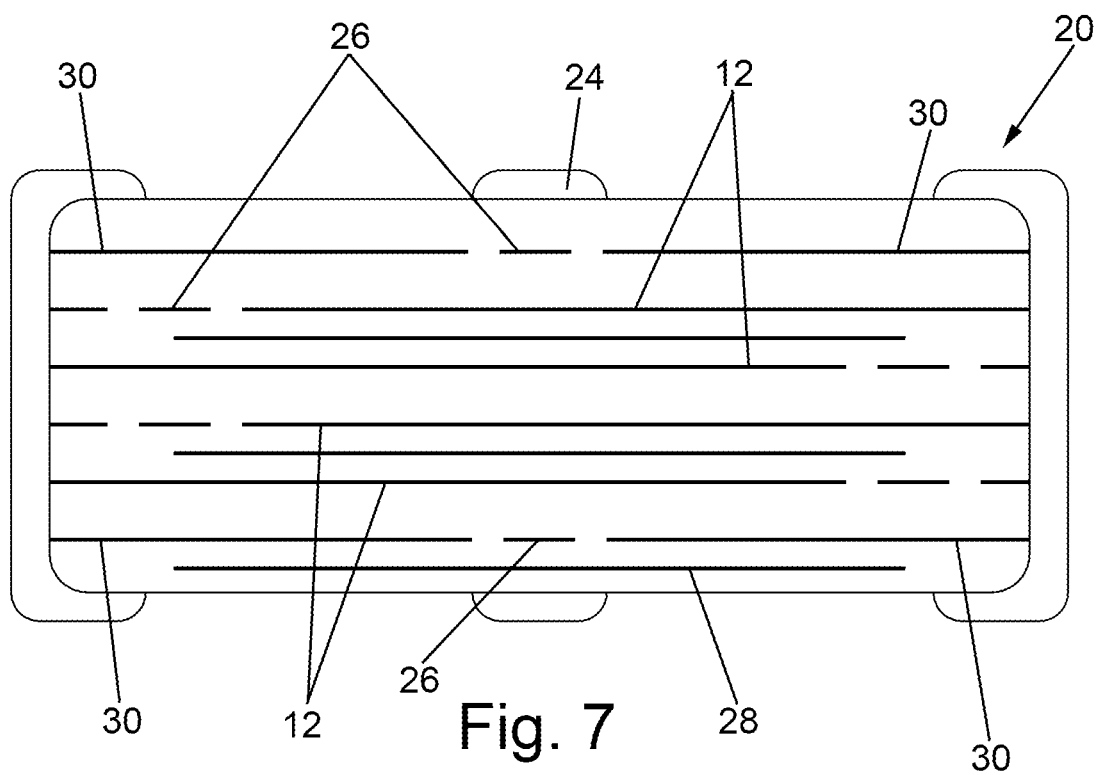
FIG. 7 is a schematic cross-sectional view of an embodiment of the invention.

The thermal dissipating layers can be disposed in the plane with internal electrodes or out of the plane of internal electrodes. A heat dissipating capacitor, 20, will be described relative to FIG. 7. In FIG. 7 the internal electrodes, 12, and dielectric, 14, form the capacitive couple between the external terminations, 16. Shield electrodes, 30, are coplanar electrodes in electrical contact with opposing external terminations wherein the shield electrodes are the outer most co planer electrodes in electrical contact with opposing external terminations. Shield electrodes inhibit arcing from an external termination to an inner electrode of opposite polarity. Shield electrode designs are described in U.S. Pat. No. 8,885,319 which is incorporated herein by reference. Coplanar thermal dissipating layers, 26, are coplanar with at least one inner electrode in electrical contact with an external termination. As would be understood, coplanar thermal dissipating layers dissipate heat through a thermal dissipating termination, 24. Out-of-plane thermal dissipating layers, 28, are not coplanar with an inner electrode in electrical contact with an external termination. As would be understood out-of-plane thermal dissipating layers dissipate heat through a thermal dissipating termination, 24.

Figure 8:
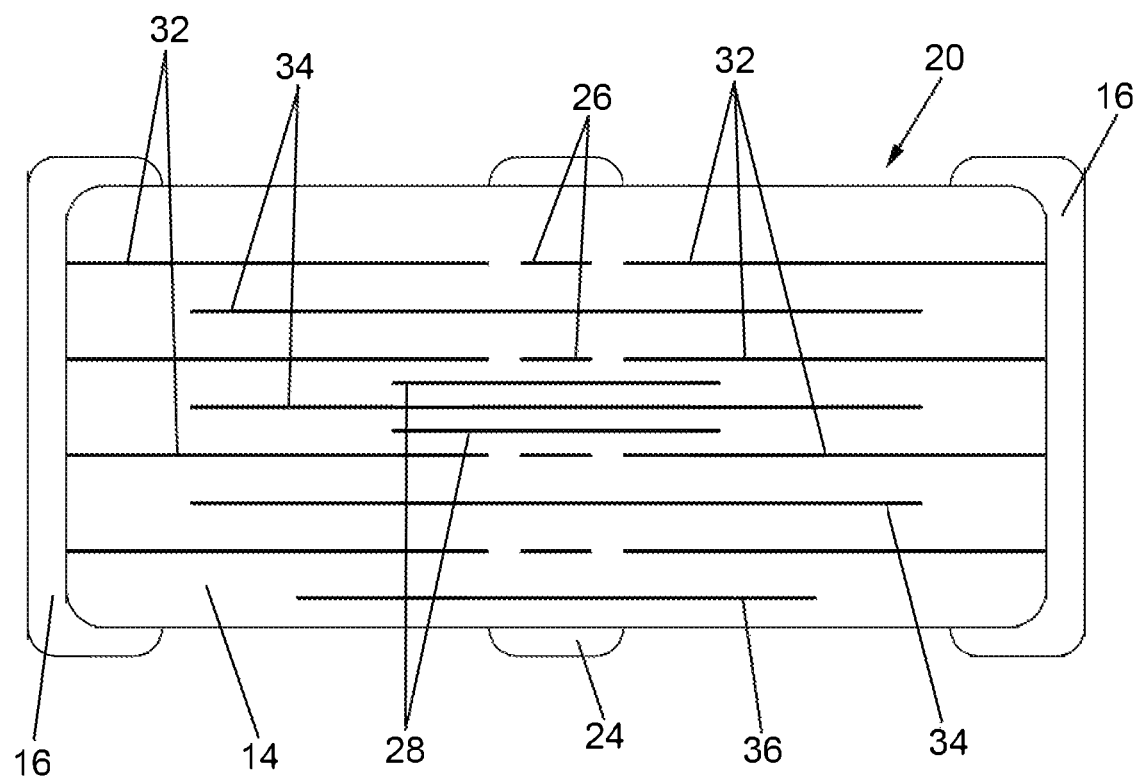
FIG. 8 is a schematic cross-sectional view of an embodiment of the invention.

A heat dissipating capacitor, 20, will be described with reference to FIG. 8. In FIG. 8 coplanar inner electrodes, 32, in electrical contact with external terminations, 16, of opposite polarity, have interleaved therebetween floating electrodes, 34. Floating electrodes are not in direct electrical contact with any external termination. In a floating electrode charge from one coplanar inner electrode passes through the dielectric, 14, to a floating electrode, 34, and back to a coplanar inner electrode of opposite polarity. A floating electrode can be in thermally conductive contact with at least one thermal conductive termination with the proviso that the thermally conductive termination provides no direct electrical functionality. Thermal dissipating layers can be coplanar thermal dissipation layers, 26, which are coplanar with at least one inner electrode, 32, or thermal dissipating layers can be out-of-plane thermal dissipating layers, 28, which are not coplanar with an inner electrode. The our-of-plane thermal dissipation layers can be internal thermal dissipation layers or external thermal dissipation layers or a combination thereof.

Figure 9:
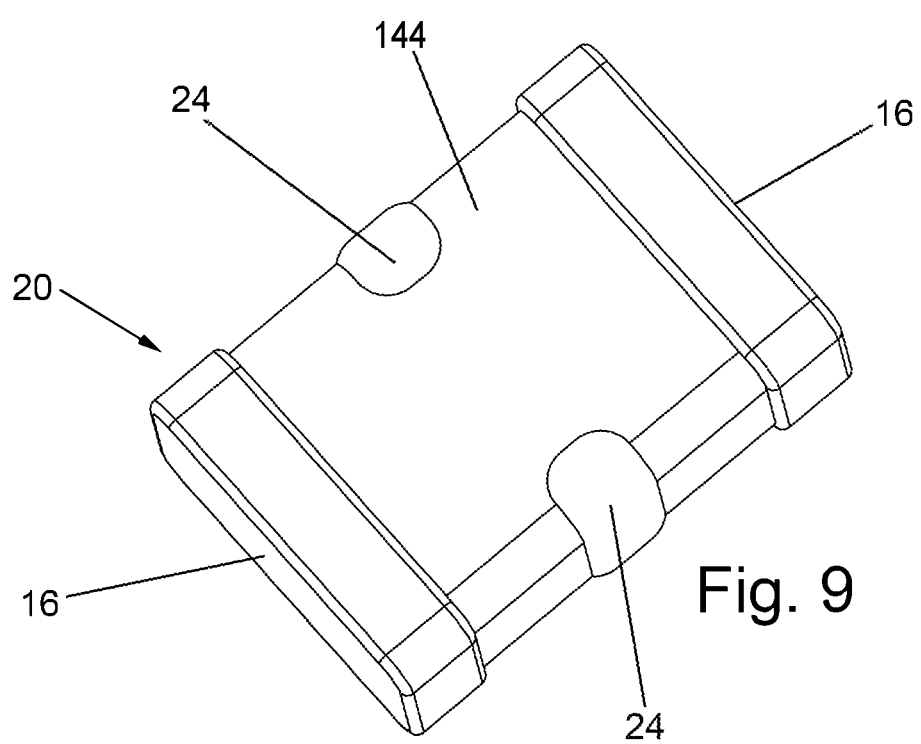
FIG. 9 is a schematic perspective view of an embodiment of the invention.

A heat dissipating capacitor, 20, will be described with reference to FIG. 9. In FIG. 9 a heat dissipating capacitor is illustrated in perspective top view. A multiplicity of thermal dissipating terminations, 24, are illustrated. A coating, 144, provides additional protection from arcing and from environmental exposure. As would be realized the thermal dissipating terminations may dissipate heat from the same thermal dissipating layers, different thermal dissipating layers or a combination thereof.

As would be realized the ability of a thermal dissipation layer to dissipate heat is dependent on the amount of material in the thermal dissipation layer, with more material providing more thermal conductivity, and the surface area of the thermal dissipation layer, wherein a higher surface area increases the ability of the thermal dissipation layer to absorb heat from the surrounding dielectric. The amount of material can be increased by increasing the thickness of the thermal dissipation layer and, in some embodiments, increasing the thickness of the thermal dissipation layer is advantageous with up to 5 times the thickness of the inner electrodes being suitable for demonstration of the invention. For manufacturing conveniences, it is preferable that the thermal dissipation layer be the same thickness as the inner electrodes since this minimizes the number of materials required and insures compatibility of the thermal dissipation layer and inner electrode with regards to processing temperatures and the like.

Figure 10:
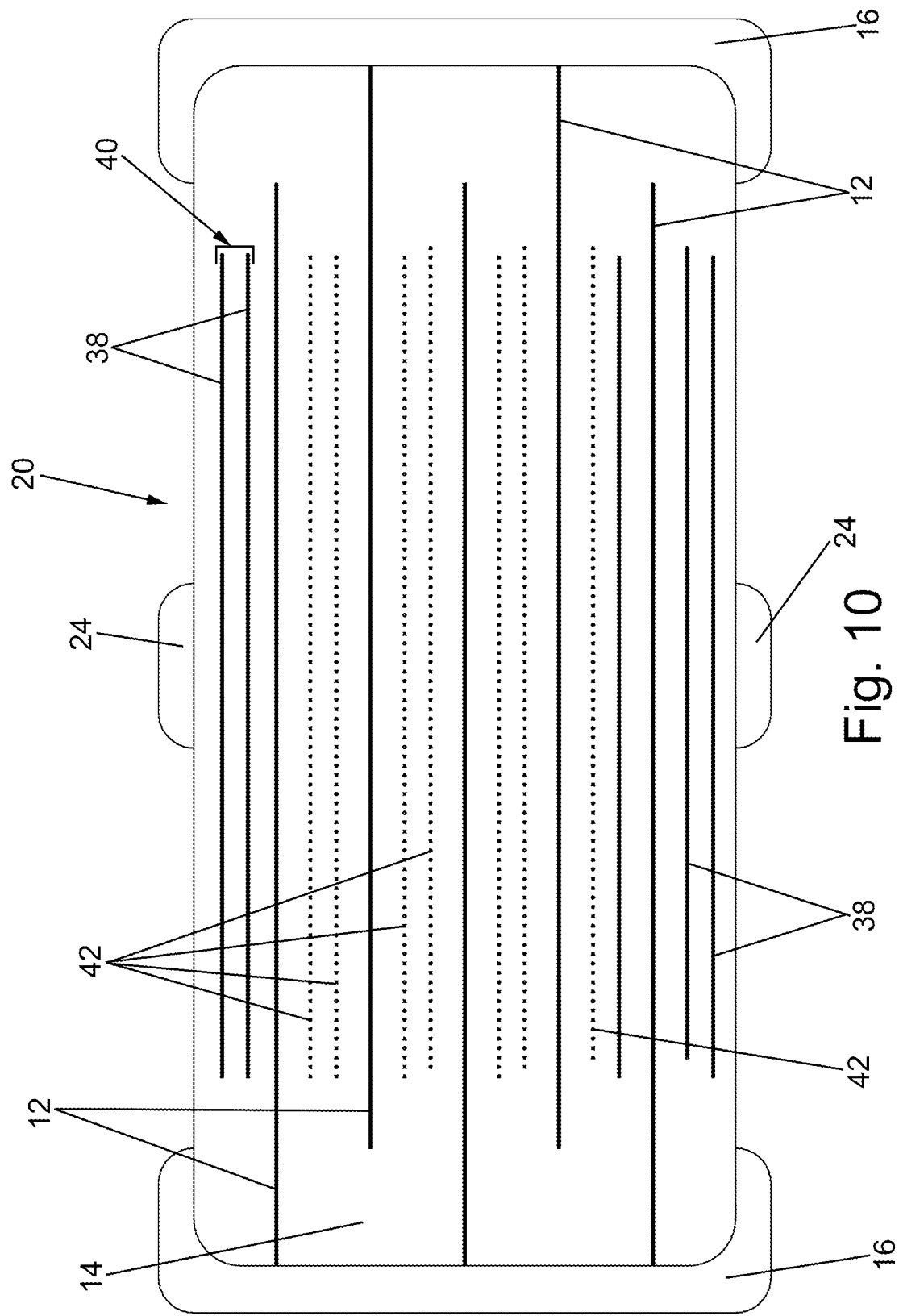
FIG. 10 is a schematic cross-sectional view of an embodiment of the invention.

An alternative to increasing the thickness of the thermal dissipation layers is to increase the number of layers and shape of the layers. An embodiment of the invention will be described with FIG. 10. In FIG. 10 a heat dissipating capacitor, 20, is illustrated in cross-sectional schematic view. The heat dissipating capacitor comprises alternating internal electrodes, 12, of opposite polarity separated by dielectric, 14, wherein adjacent internal electrodes are in electrical contact with opposite external terminations, 16. Continuous thermal dissipation layers, 38, can be used as a single layer, as illustrated and discussed relative to FIG. 7, or adjacent thermal dissipation layers can be employed which are separated by dielectric. A pair of adjacent thermal dissipation layers is illustrated at 40 of FIG. 10 with the understanding that the number of adjacent thermal dissipation layers can be quite large. Discontinous thermal dissipation layers, 42, comprise discreet extensions or fingers thereby increasing the available surface area between the thermal dissipation layer and dielectric. As would be realized from FIG. 10, continuous thermal dissipation layers and discontinuous thermal dissipation layers may independently be in a single layer, adjacent layers or combined as adjacent layers.

Figure 11:
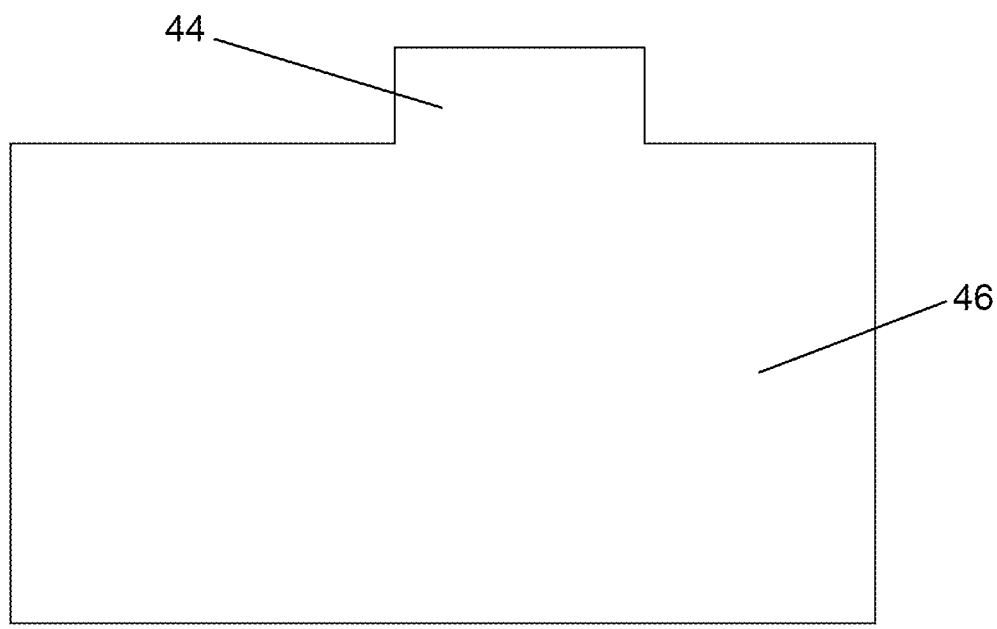
FIG. 11 is a schematic top view of an embodiment of the invention.
Figure 12:
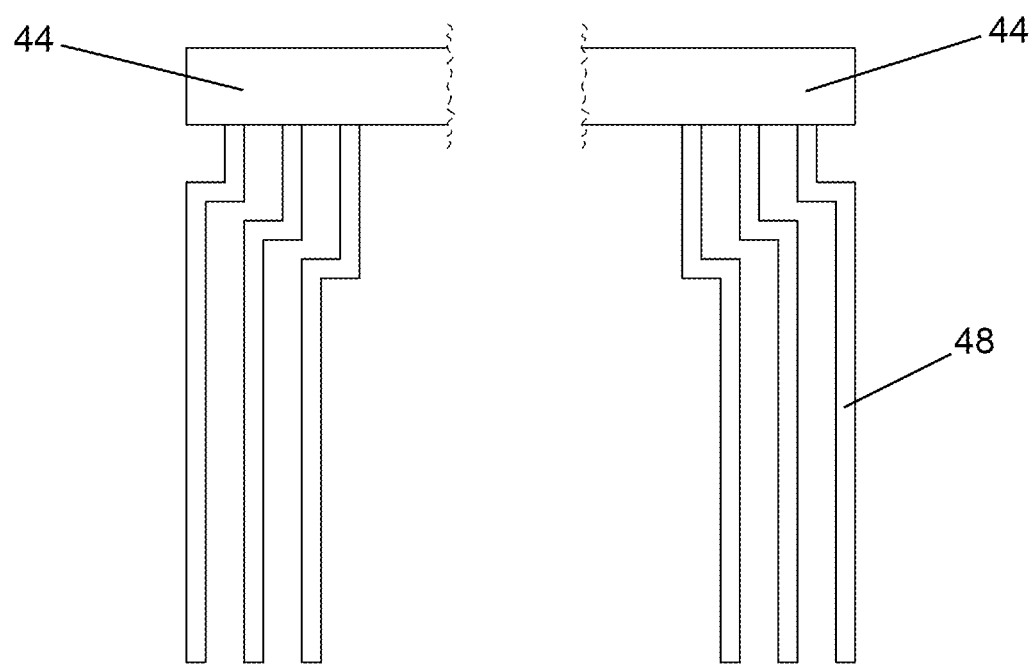
FIG. 12 is a schematic top view of an embodiment of the invention.

A continuous thermal dissipation layer is illustrated in isolated view in FIG. 11 and a discontinuous thermal dissipation layer is illustrated in isolated view in FIG. 12. In FIG. 11, a tab, 44, is provided for thermally conductive contact with the thermal conductive termination and the body, 46, of the thermal dissipation layer is a continuous body and preferably rectangular. In FIG. 12, a tab, has extending therefrom at least two discreet extensions, 48, in thermally conductive contact with the tab. It is preferable that the continuous thermal dissipation layer and discontinuous dissipation layer be independently of a unified construction.

Figure 13:
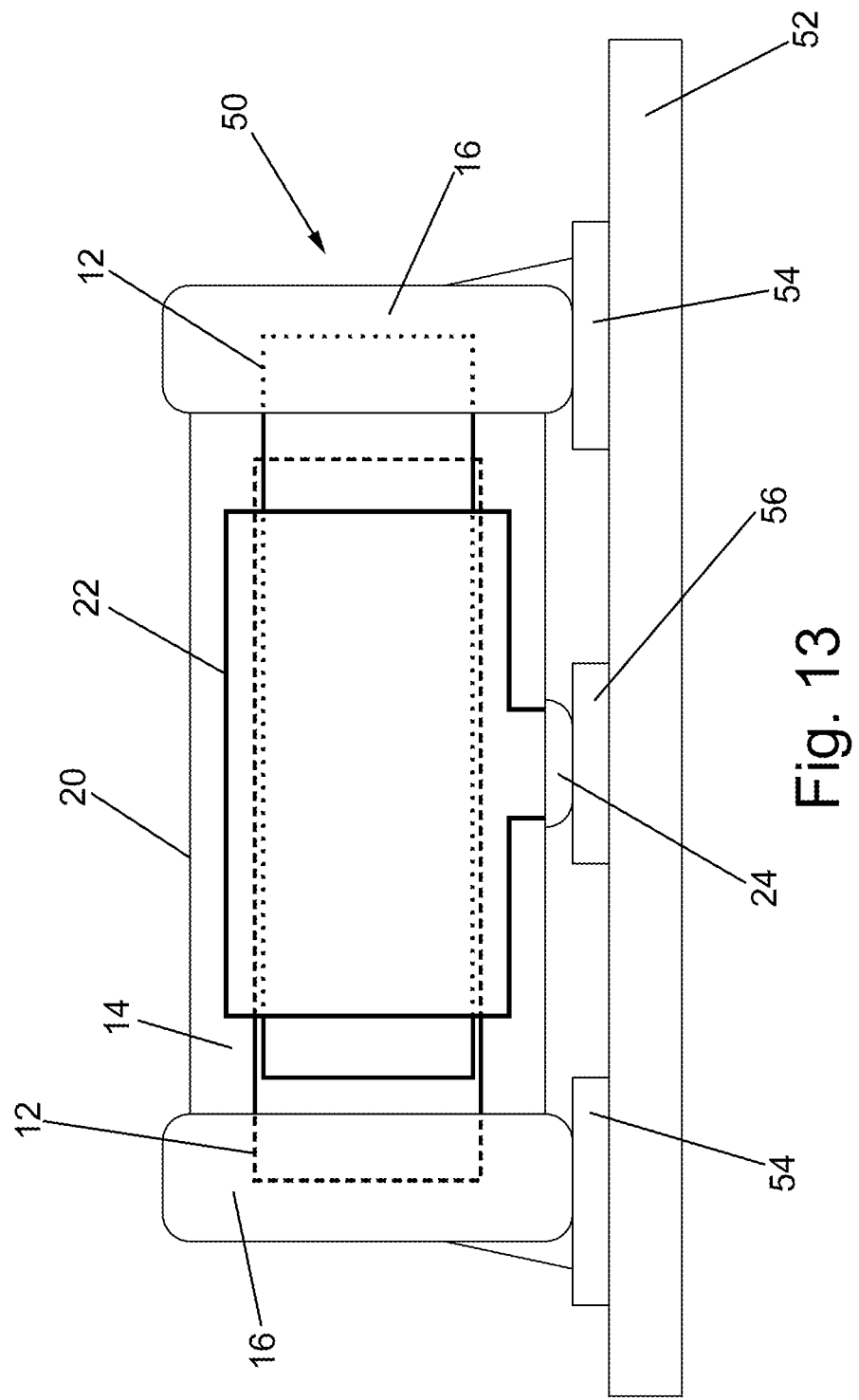
FIG. 13 is a schematic cross-sectional view of an embodiment of the invention.

An embodiment of the invention will be described with reference to FIG. 13. In FIG. 13, an electronic device, 50, is illustrated in partial view. The electronic device comprises a substrate, 52, comprising active traces, 54, and a thermal dissipation trace, 56. A heat dissipating capacitor, 20, is mounted on the substrate wherein the active traces are in electrical contact with the external terminations, 16, and the thermal dissipation trace is in thermally conductive contact with the thermal dissipation termination, 24. The internal electrodes, 12, and thermal dissipation layer, 22, are perpendicular to the substrate. Mounting the heat dissipating capacitor with the internal electrodes perpendicular to the substrate reduces equivalent series resistance (ESR) which lowers power dissipation and reduces inductance, ESL. In power supplies reducing the inductance is advantageous at higher frequencies. In the case of DC Link capacitors, large inductances at switching frequencies, such as above 10 kHz, can place the ripple frequency in the inductive region of the bus impedance that can increase the ripple voltage as discussed in U.S. Pat. No. 10,084,310 which is incorporated herein by reference.

Figure 14:
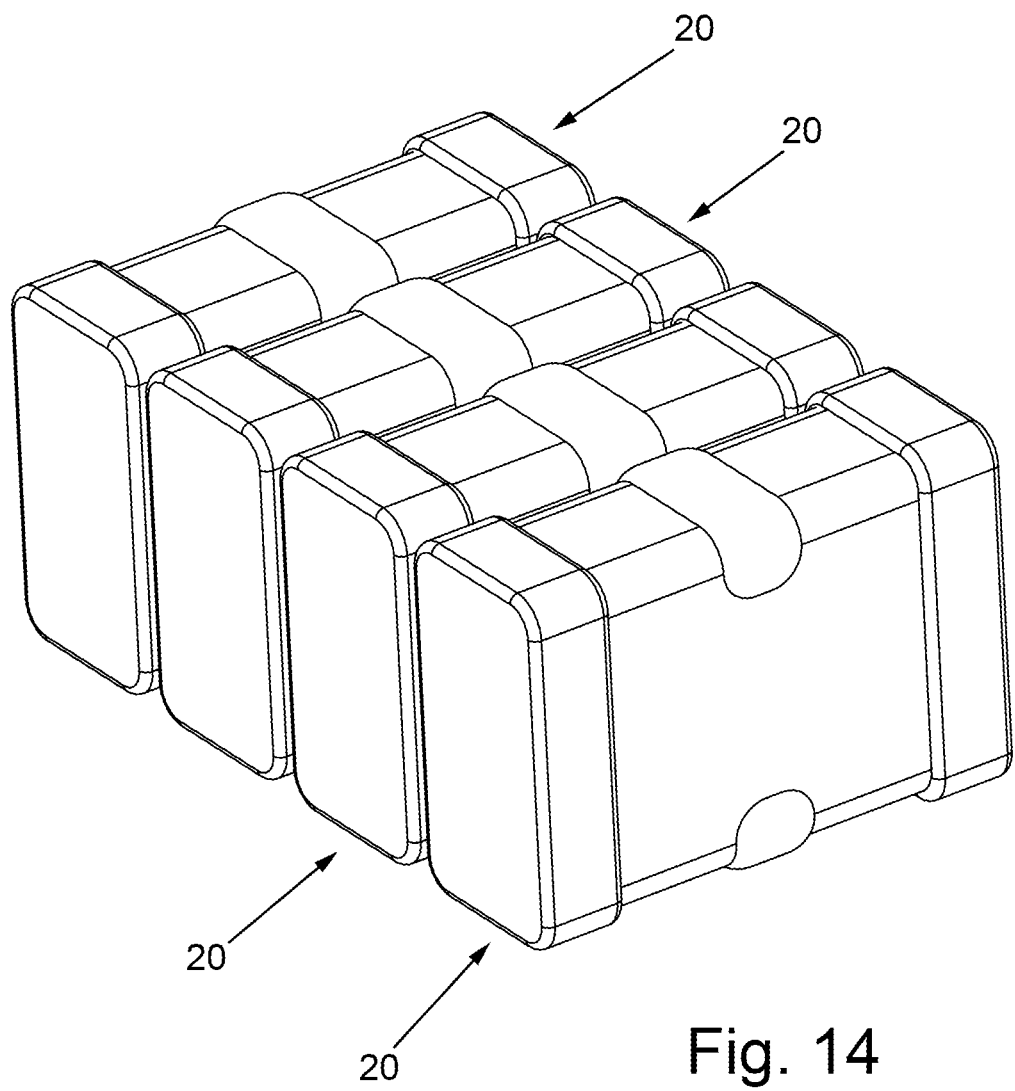
FIG. 14 is a schematic perspective view of an embodiment of the invention.

An embodiment of the invention will be described relative to FIG. 14. In FIG. 14 multiple heat dissipating capacitors, 20, are combined in a stack with four shown for convenience without limit thereto. The formation of stacks using leads or leadless stack technology is discussed in U.S. Pat. No. 9,472,342, which is incorporated herein by reference.

For a heat dissipating capacitor comprising shield electrodes, and other high voltage designs, that are not coated it is preferred not to have the heat dissipation electrode in the outermost position to avoid interference with arc suppression. In the case of forming the outermost heat dissipating layer it is therefore preferred to form this with a discontinuous electrode or even more preferably an insulating, thermal conductive ceramic. Insulating, thermally conductive ceramics are also preferred for out-of-plane heat dissipation layers because these are situated between inner electrodes of opposite polarity any breakdown of the dielectric layer to a continuous heat dissipating electrode could short the capacitor through the third terminal.

The dielectric is not particularly limited herein. C0G dielectrics are commonly employed in the art and are preferred due to their minimal change in capacitance as a function of temperatures. A particularly suitable capacitor for demonstration of the invention utilizes nickel inner electrodes and a calcium zirconate based dielectric. Another suitable capacitor for demonstration of the invention is a Class 2 X7R such as barium titanate based dielectric with nickel, copper or precious metal inner electrodes. In the case of precious metal palladium or silver inner electrodes, the first termination is preferably silver based.

Barium titanate and calcium zirconate ceramics have low thermal conductivity although they may be incorporated in the heat dissipating layers when it is necessary to maintain dielectric continuity when these are interleaved between out-of-plane active electrodes of opposed polarity. Tungsten is a high melting point metal (3,422° C.) with almost double the thermal conductivity of nickel (Melting Point 1,455° C.) and therefore tungsten is a particularly suitable material for use in the thermal dissipation layer. Insulators with high thermal conductivity such as aluminum nitride or beryllium oxide can be incorporated into the heat dissipating layers to maintain high thermal conductivity even when discontinuous electrodes are used.

Electrically conductive materials can effectively be used to form the thermal dissipation terminations for removing heat through the circuit board and resulting environment. In cases where the proximity of the external terminations are close and very high voltages are used it can be advantageous to use an electrically insulating but thermally conducting termination. This can be achieved by dispersing a highly conducting insulator, such as aluminum nitride, in an epoxy, in a similar manner to the electrically conducting Ag in epoxy. In all these heat dissipating layers and terminations the objective is to achieve a high thermally conductive pathway for heat to be removed from the MLCC.

The materials used for the heat dissipating layers preferably have a high thermal conductivity. Particularly preferred materials for the heat dissipating layers and their thermal conductivity in W/(mK) include aluminum nitride (285), beryllium oxide (330), nickel (91), tungsten (170), gold (320), copper (400), silver (430) and aluminum (235).

Since the thermal dissipation layers play no electrical role in the capacitor function the separation between the active internal electrodes of opposite polarity can be maintained allowing high voltage performance to be realized whilst optimizing the heat removal.

The position of the thermally dissipating inner layers can be optimized within the MLCC to remove heat where needed such as 'hot spot' areas related to other factors such as the application frequency.

The materials used in the inner layers and heat dissipating terminals may be optimized to increase their thermal conductivity for heat removal and so not necessarily the same as the active internal electrodes of opposite polarity or their terminations.

The circuit board design used in the assembly of the MLCC of this invention can be optimized to conduct and dissipate heat from the terminal or terminals connected to the thermally dissipating inner layers to achieve optimal performance in the circuit.

EXAMPLES

For the purposes of demonstrating the invention Class 1 C0G BME MLCC's were prepared using nickel inner electrodes and a calcium zirconate-based dielectric. EIA 1812 Case Size MLCCs were manufactured with the same materials, dielectric and inner electrodes to demonstrate this invention as follows.

Example 1 (Prior Art)

A 2-terminal 1812 MLCC was made as illustrated in FIG. 1 to meet a nominal 33 nF 630V rating using a calcium zirconate based C0G dielectric and base metal nickel electrodes. These were terminated using a copper thick film paste followed by nickel then tin plating over this.

Example 2 (Inventive)

A 3-terminal 1812 MLCC was made as illustrated in FIG. 2 to also meet a nominal 33 nF 630V rating using the same calcium zirconate based C0G dielectric and base metal nickel electrodes as Example 1. In this case additional nickel inner electrodes, as thermal dissipation layers, were disposed between each of the nickel internal electrodes and contacted to a third termination, as a thermal dissipation termination, on the side of the MLCC. These thermal dissipation layers contacted the third terminal. The design details and capacitance values are provided in Table 1 wherein Capacitance is as measured across the external terminations, AC is the number of inner electrodes, HDP is the number of thermal dissipation layers, Distance is the distance between inner electrodes and Thickness is the thickness of the MLCC.

TABLE 1

| Sample | Capacitance | AC | HDP | Distance | Thickness |
|---|---|---|---|---|---|
| Example 1 | 36.2 nF | 135 | 0 | 10.4 μm | 2.0 mm |
| Example 2 | 37.5 nF | 135 | 132 | 10.4 μm | 2.0 mm |

MLCC Characteristics

Figure 15:
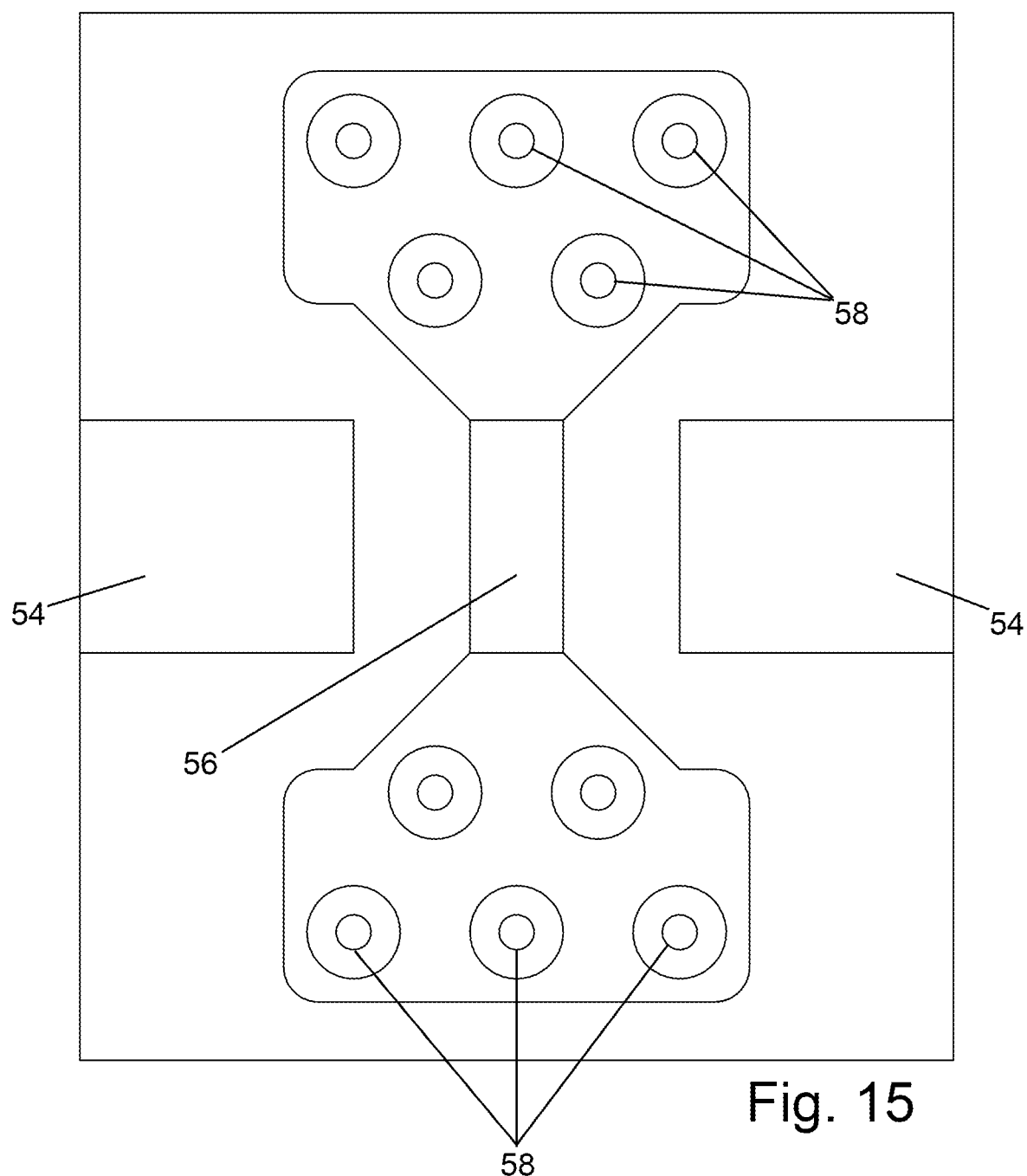
FIG. 15 is a schematic representation of a test fixture.

Samples of Examples 1 and 2 were soldered onto the test board shown in FIG. 15 using a Pb-free SAC 305 solder. In FIG. 15, the pads are as described relative to FIG. 13. Thermal vias, 58, allowed for a measurement of temperature.

The thermal dissipation trace, 56, was not active electrically but was in electrical and thermal contact with the thermal vias on the board to help dissipate the heat. There are also some smaller thermal vias below this pad. In both cases the MLCC samples were orientated such that the electrodes were perpendicular to the test board. In the case of Example 1 the 2-terminal parts were soldered onto the active pads, 54.

The assembled samples of Examples 1 and 2 were placed on a thermal heat sink. A thermocouple was attached to the heat sink to provide a reference temperature and an optical thermal probe was attached to the top of the samples. The samples were exposed to increased ripple currents testing at 310 kHz. The temperature rises at the surface of the samples were recorded from a room temperature ambient of −25° C. using the optical probe. The testing voltage was increased to achieve 2 Arms increments from 0 to 10 Arms. The part temperatures were allowed to stabilize for 5 minutes at each level and the temperature rises recorded. The step increments were reduced to 1 Arms from 10 Arms and the temperature rises recorded in the same way. The results are provided graphically in FIG. 16.

Figure 16:
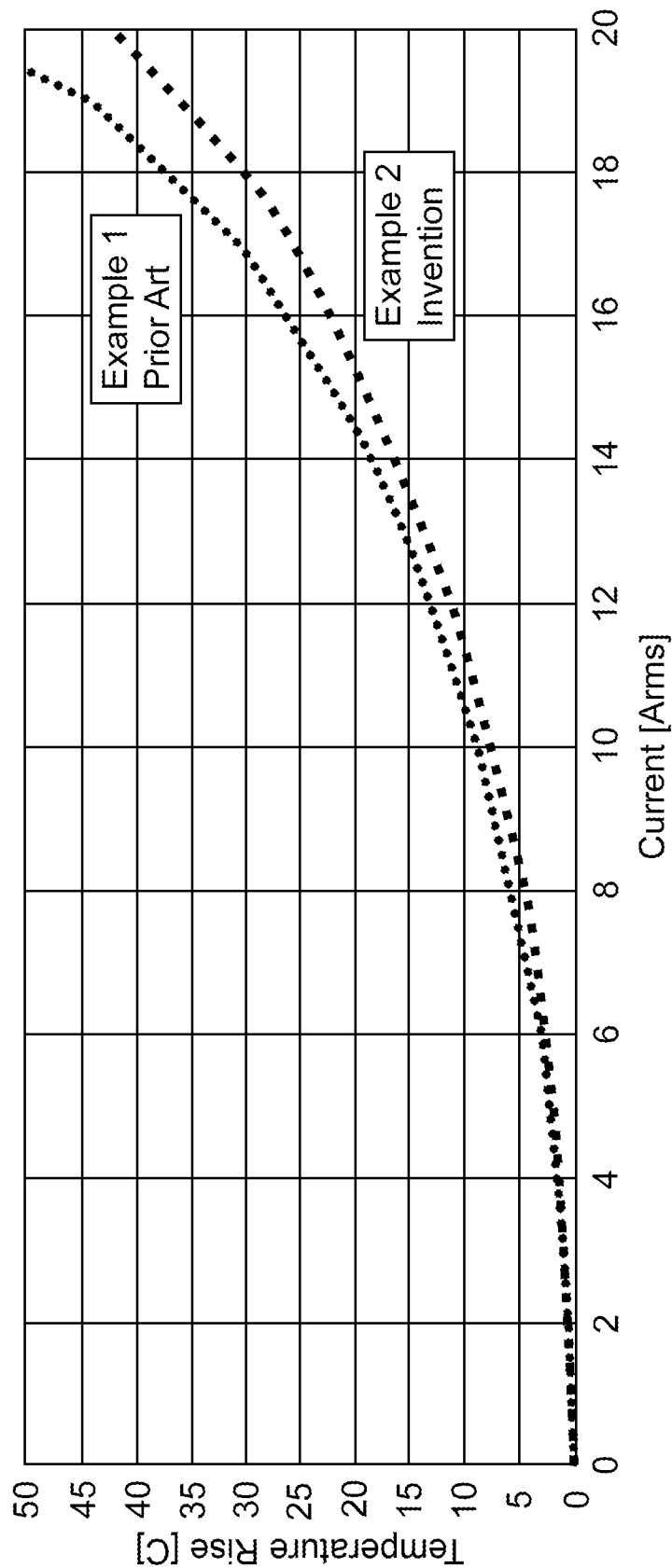
FIG. 16 is a graphical representation of an advantage provide by the invention.

As shown in FIG. 16, the inventive Example 2 has a smaller increase in temperature with increasing ripple current. At 18 Arms, 255 Vrms, the temperature rise of Example 1 was 37° C. that is 7.2° C. higher than Example 2 of 29.8° C.

The invention has been described with reference to preferred embodiments without limit thereto. One of skill in the art would realize additional embodiments which are described and set forth in the claims appended hereto.

The invention claimed is:

1. A heat dissipating electronic device comprising:
   internal electrodes of opposing polarity forming a capacitive couple between external terminations wherein said internal electrodes are in coplanar pairs of opposing polarity;
   a dielectric between said internal electrodes;
   at least one thermal dissipation layer wherein said at least one thermal dissipation layer is between adjacent said coplanar pairs;
   at least one thermal conductive terminal wherein said at least one thermal dissipation layer is in electrically conductive contact with said thermal conductive terminal and said thermal conductive terminal is not in electrical contact with said external terminations, and said thermal conductive terminal does not contribute to electrical functionality of said capacitive couple wherein said thermal conductive termination is in thermal conductive contact with a thermal dissipation trace wherein said thermal dissipation trace does not contribute to electrical functionality of said capacitive couple; and
   a substrate comprising active traces and said thermal dissipation trace wherein said active traces are in electrical contact with said external terminations.

2. A heat dissipating electronic device of claim 1 comprising multiple thermal dissipation layers.

3. A heat dissipating electronic device of claim 2 wherein two said thermal dissipation layers are adjacent thermal dissipation layers.

4. A heat dissipating electronic device of claim 3 wherein said dielectric is between said adjacent thermal dissipation layers.

5. A heat dissipating electronic device of claim 3 wherein said adjacent thermal dissipation layers do not have an inner electrode between said adjacent thermal dissipation layers.

6. A heat dissipating electronic device of claim 2 wherein two said thermal dissipation layers have an inner electrode between said thermal dissipation layers.

7. A heat dissipating electronic device of claim 1 wherein said at least one thermal dissipation layer is external to said capacitive couple.

8. A heat dissipating electronic device of claim 1 wherein said at least one thermal dissipation layer has at least one inner electrode on each side of said thermal dissipation layer.

9. A heat dissipating electronic device of claim 1 wherein said at least one thermal dissipation layer is a continuous thermal dissipation layer or a discontinuous thermal dissipation layer.

10. A heat dissipating electronic device of claim 1 further comprising a second thermal conductive termination.

11. A heat dissipating electronic device of claim 10 wherein said thermal conductive termination and said second thermal conductive termination are in thermally conductive contact with said at least one thermal dissipation layer.

12. A heat dissipating electronic device of claim 10 wherein said second thermal conductive termination is in thermally conductive contact with a second thermal dissipation layer.

13. A heat dissipating electronic device of claim 1 further comprising at least one of a shield electrode or a floating electrode.

14. A heat dissipating electronic device of claim 1 wherein said thermal conductive termination is an insulator.

15. A heat dissipating electronic device of claim 1 further comprising a coating.

16. A heat dissipating electronic device of claim 1 wherein said at least one thermal dissipation layer comprises at least one material selected from the group consisting of aluminum nitride, beryllium oxide, nickel, tungsten, gold, copper, silver and aluminum.

17. A heat dissipating electronic device of claim 16 wherein said thermal dissipation termination comprises at least one material selected from the group consisting of aluminum nitride, nickel, tungsten, gold, copper, silver and aluminum.

18. A heat dissipating electronic device of claim 1 wherein said dielectric comprises barium titanate, calcium zirconate or combinations of these.

19. A heat dissipating electronic device of claim 1 further comprising at least one capacitor.

20. A heat dissipating electronic device comprising:
   internal electrodes of opposing polarity forming a capacitive couple between external terminations;
   a dielectric between said internal electrodes;
   at least one thermal dissipation layer wherein said at least one thermal dissipation layer is not coplanar with an internal electrode of said internal electrodes wherein said at least one thermal dissipation layer has a thickness of no more than 5 times the thickness of said inner electrodes and wherein said at least one thermal dissipation layer is coplanar with at least one inner electrode of said internal electrodes and between coplanar said internal electrodes and wherein said thermal dissipation layer is in thermal conductive contact with a thermal dissipation trace wherein said thermal dissipation trace is not electrically connected to said capactive couple;
   at least one thermal conductive termination wherein said at least one thermal dissipation layer is in electrically conductive contact with said thermal conductive termination and said at least one thermal dissipation layer is in not in electrical contact with said external terminations; and a substrate comprising active traces and said thermal dissipation trace wherein said active traces are in electrical contact with said external terminations.

21. A heat dissipating electronic device of claim 20 comprising multiple thermal dissipation layers.

22. A heat dissipating electronic device of claim 21 wherein two said thermal dissipation layers are adjacent thermal dissipation layers.

23. A heat dissipating electronic device of claim 22 wherein said dielectric is between said adjacent thermal dissipation layers.

24. A heat dissipating electronic device of claim 22 wherein said adjacent thermal dissipation layers do not have an inner electrode between said adjacent thermal dissipation layers.

25. A heat dissipating electronic device of claim 21 wherein said thermal dissipation layers have an inner electrode between said thermal dissipation layers.

26. A heat dissipating electronic device of claim 20 wherein said at least one thermal dissipation layer is external to said capacitive couple.

27. A heat dissipating electronic device of claim 20 wherein said at least one thermal dissipation layer is has at least one inner electrode on each side of said at least one thermal dissipation layer.

28. A heat dissipating electronic device of claim 20 wherein said at least one thermal dissipation layer is selected from a continuous thermal dissipation layer or a discontinuous thermal dissipation layer.

29. A heat dissipating electronic device of claim 20 further comprising a second thermal conductive termination.

30. A heat dissipating electronic device of claim 29 wherein said thermal conductive termination and said second thermal conductive termination are in thermally conductive contact with said at least one thermal dissipation layer.

31. A heat dissipating electronic device of claim 29 wherein said second thermal conductive termination is in thermally conductive contact with a second thermal dissipation layer.

32. A heat dissipating electronic device of claim 20 further comprising at least one of a shield electrode or a floating electrode.

33. A heat dissipating electronic device of claim 32 wherein said thermal conductive termination is in thermally conductive contact with said floating electrode.

34. A heat dissipating electronic device of claim 33 wherein said thermal conductive termination is an insulator.

35. A heat dissipating electronic device of claim 20 further comprising a coating.

36. A heat dissipating electronic device of claim 20 wherein said at least one thermal dissipation layer comprises at least one material selected from the group consisting of aluminum nitride, beryllium oxide, nickel, tungsten, gold, copper, silver and aluminum.

37. A heat dissipating electronic device of claim 36 wherein said at least one thermal dissipation termination comprises at least one material selected from the group consisting of aluminum nitride, nickel, tungsten, gold, copper, silver and aluminum.

38. A heat dissipating electronic device of claim 20 wherein said dielectric comprises barium titanate, calcium zirconate or combinations of these.

39. A heat dissipating electronic device of claim 20 further comprising at least one capacitor.

\* \* \* \* \*